United States Patent
Kesselring et al.

[15] 3,641,679
[45] Feb. 15, 1972

[54] RUGGEDIZED FLUX VALVE ASSEMBLY

[72] Inventors: Donald J. Kesselring; Thomas G. Mulera, both of Phoenix, Ariz.

[73] Assignee: Sperry Rand Corporation, Great Neck, N.Y.

[22] Filed: June 29, 1970

[21] Appl. No.: 50,482

[52] U.S. Cl. ............................33/204, 33/223, 33/220, 267/136
[51] Int. Cl. .............................G01c 17/30, G01c 17/18
[58] Field of Search..............33/223, 204 FA, 220 R, 73 D, 33/DIG. 6; 267/136, 139; 244/1

[56] References Cited
UNITED STATES PATENTS

| | | | |
|---|---|---|---|
| 2,210,435 | 8/1940 | Ruf | 33/DIG. 6 |
| 2,346,578 | 4/1944 | Haskins | 33/DIG. 6 |
| 3,582,018 | 6/1971 | Tirabassi | 33/223 X |
| 3,588,001 | 6/1971 | Mitchell | 33/223 X |

*Primary Examiner*—Robert B. Hull
*Attorney*—S. C. Yeaton

[57] ABSTRACT

A pendulous flux valve universally mounted in a supporting housing having a resilient and a rigid bumper which permits the use of smaller mounting pivots to enhance repeatability. The rigid bumper is located so as to act at or about the center of percussion of the flux valve and associated pendulous parts, whereby the pivot mounting point is subjected to minimum shock.

5 Claims, 1 Drawing Figure

PATENTED FEB 15 1972 3,641,679
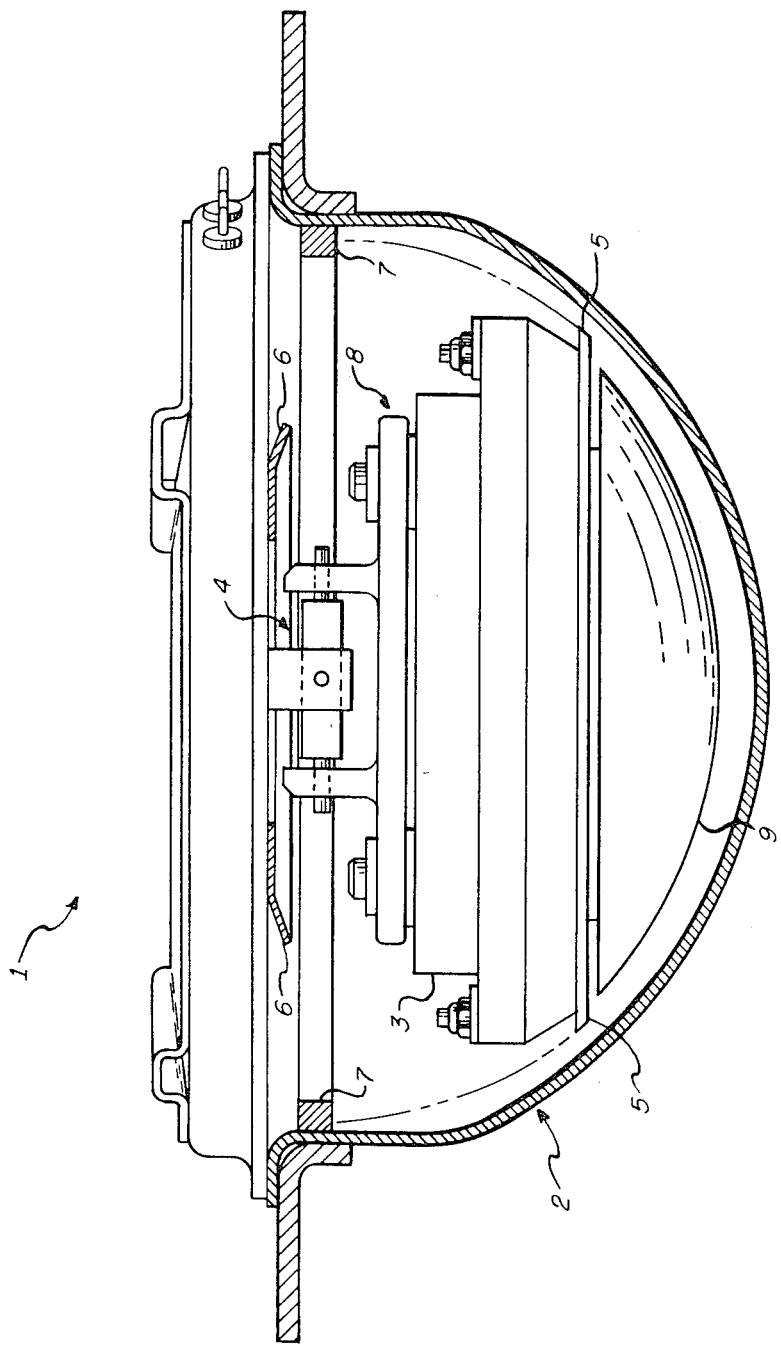
INVENTORS
DONALD J. KESSELRING
THOMAS G. MULERA
BY
ATTORNEY

RUGGEDIZED FLUX VALVE ASSEMBLY

BACKGROUND OF THE INVENTION

1. Field of the Invention

The invention relates generally to improvements in flux valve compasses of the type wherein the flux valve sensor is pendulously mounted in a support housing, and more particularly to apparatus for reducing the deleterious effects of environmental shock acting upon the sensitive flux valve.

2. Description of the Prior Art

Extant flux valves are normally suspended in a supporting housing by relatively large pivot elements and the angular freedom of travel about the suspension pivot is restricted by a resilient annular bumper member. In a shock environment, the swinging force of the flux valve against the housing is borne jointly by the bumper and the pivot assembly. For large shocks, the strain caused by coupling moments placed upon the pivots by the mass of the pendulous valve is relatively substantial, requiring corresponding relatively massive pivot members. The size of the pivot members therefore inherently precludes a minimum friction pivot and thus severely effects repeatability of the flux valve. A tendency to wear and flake is also evident at the pivot which further derogates repeatability.

SUMMARY OF THE INVENTION

To restrain excessive movement of the flux valve within its supporting housing under extreme vibration, a rigid bumper is attached to the flux valve housing. The location of the rigid bumper on the housing with respect to the flux valve element is such that the point of impact therebetween is at the flux valve center of percussion. Thus, the impact will not create any coupling moments about the pivot point. The reduced force acting through the pivot will permit the installation and use of smaller pivots without any deleterious effects in reliability. Smaller pivots will in turn result in less friction and inherently increase the accuracy and repeatability of the flux valve.

A primary object of the invention is to provide a ruggedized flux valve of greater reliability, sensitivity, and repeatability.

Another object of the invention is to provide a rigid bumper acting through the center of percussion of the flux valve.

Another object of the invention is to reduce the size of the pivots without jeopardizing the longevity of the flux valve.

Another object of the invention is to reduce the effect of the vertical component of the earth's magnetic field on the flux valve by assuring that the pendulous valve always seeks the gravity vertical.

Another object of the invention is to reduce the probability of "flaking" at the pivot point.

BRIEF DESCRIPTION OF THE DRAWINGS

The sole FIGURE illustrates a cross section of a typical flux valve assembly having both a resilient and rigid bumper installed.

DESCRIPTION OF THE PREFERRED EMBODIMENT

In most modern aircraft, accurate magnetic heading information is provided by some combination of a directional gyro and a remote compass transmitter. One type of remote compass transmitter is known as a flux valve. It is so designed that the sensitive element thereof ideally senses only the horizontal component of the earth's magnetic field; that is, the flux valve is so mounted in the aircraft that the pickup or output windings thereof are maintained substantially horizontal. The aircraft's magnetic heading is the angular difference between the horizontal component of the earth's magnetic field and the horizontal projection of the aircraft's longitudinal axis. A typical slaved gyromagnetic compass system is described in detail in "Flux Valve Magnetic Compass," U.S. Pat. No. 2,357,319 issued Sept. 5, 1944, and assigned to the instant assignee. In practice, however, there exists the possibility of errors in the compass system which results principally from two causes (a) the interaction of various magnetic fields originating in the aircraft's structure with the earth's magnetic field, and (b) the tilting of the flux valve out of the horizontal plane so that the flux valve output includes a portion of the vertical component of the earth's magnetic field. These two types of flux valve errors may be considered as static errors and dynamic errors, respectively. A means for reducing or eliminating the static and dynamic errors in the measurement of the horizontal component of the earth's magnetic field at a point remote from the flux valve is described in "Flux Valve Compensating System," U.S. Pat. No. 2,852,859 issued Sept. 23, 1958, and assigned to the instant assignee. A detailed discussion of the construction and mode of operation of the basic flux valve is also contained therein.

The instant application also seeks to provide a means for reducing the static and dynamic errors contained within a flux valve. The teaching of the invention is directed to a construction which will inherently impose less undesired destructive physical strain on the flux valve from abrupt movements and/or vibration of the vehicle and thereby raise the inherent accuracy and reliability capability of the flux valve.

A flux valve must have a predetermined degree of freedom about the vehicle roll and pitch axis so that it can, by pendulous movement, align itself in the vertical axis. To maintain such an alignment, several mutually competitive factors are present and improving one factor may impair the total accuracy as another factor may be more severely degraded. Ideally, the point of suspension would be a dimensionless point to avoid friction. This is, of course, impossible so the friction must be at a minimum to provide the least amount of resistance to any pendulous movement and thereby insure a constant near vertical flux valve orientation.

A universal joint is admirably suited to this type of suspension in that it provides the requisite dual axis freedom, and, if the pivot points are small, friction is minimal. Within a range of stress, the amount of friction is easily determinable and repetitive.

The size of the pivot points in a universal joint must be minimal, and they may be minimized in a flux valve by controlling the shock force the flux valve exerts on them. A manner of limiting the shock force is to immerse the flux valve in a fluid within the housing and this provides a damping effect. A fluid suitable for this function must be sufficiently viscous to have a pour point at −100° F. and yet not burn at +500° F. and be nonconductive. Silicone oil appears to satisfy these requirements. A supplemental manner, and the subject of this invention, is to provide a limiting device at the extremity of pendulous movement which subjects the point of suspension to a least amount of shock. Previously, a semiresilient member has been used which will damp the initial shock of the flux valve swinging to its extreme position. If the force is great enough, it will not be completely dissipated by the semiresilient member and will then force the semiresilient member to its ultimate stop position. Such a stop usually created large coupling moments at the point of suspension and caused permanent damage unless the suspension apparatus was sufficiently strong. The requirement for strength necessarily demanded large pivoting members.

If, however, the coupling moments could be reduced or substantially eliminated, no additional strength would be required at the pivots and they could be of minimal size. Some resilience is still desired to deaccelerate the flux valve at a rate less than an absolute stop in order to protect the delicate electrical equipment. The coupling moments present during such deacceleration are controllable, and by appropriate design, limit the stresses applied to the suspension apparatus. The coupling moments present due to the hard stop are negligible if the hard stop force acts through the center of percussion of the flux valve. Thus, the severe and damaging aspects of limiting the freedom of the flux valve do not subject the point of suspension to destructive forces. A method of accomplishing the above objective is that of employing two movement arresting systems, a resilient bumper and a rigid bumper. However, it is conceivable that the effects of each would be combined into one bumper acting at the center of percussion of the flux valve.

The sole figure illustrates the relationship of both the resilient and the rigid bumpers in a standard flux valve assembly. The flux valve housing is comprised of a bowl-shaped member 2 rigidly attached to a cover plate assembly 1. The flux valve assembly 3 is attached to the cover plate 1 through a pivot 4, which is generally a universal joint of the pin and gimbal type. Thus, the flux valve 3 is free to swing for a limited arcuate distance about two axes. A viscous dielectric fluid may fill the housing and damp the normal movement of the pendulous valve assembly.

An annular resilient bumper 6 such as a thin metallic disc having outwardly and downwardly extending flange portions is attached by suitable means to the cover plate 1. The bumper 6 is generally axially aligned with the universal joint 4. A flux valve support assembly 8 which may be a rigid metal plate, serves to rigidly couple the flux valve sensitive element 3 to the universal joint 4. A suitable weight 9, such as brass, is rigidly secured to the bottom of the flux valve sensitive element 3 to provide the pendulum mass for maintaining the sensitive element in the horizontal plane. The assembly 8 is arranged so as to engage a portion of bumper 6 should the flux valve tend to swing an arcuate distance greater than a predetermined amount and reduce the shock of deacceleration of the flux valve 3 and mass 9. If the force is great enough, the resilient bumper 6 will yield until it or the top edge of assembly 3 is forced against the cover housing plate 1 and if this were allowed to occur, the force moments about the suspension assembly 4 would be substantial and possibly deform the pivoting parts. To overcome this problem the bumper system 5,7 is added.

An annular rigid bumper 7 is attached to the bowl-shaped housing member 2 at or near the upper edge of the bowl 2. An annular striker plate 5 is attached to the lower portion of flux valve 3. During normal free swinging motion, the striker plate 5 has no functional utility and acts simply as part of the pendulous weight of the flux valve.

The rigid bumper 7 and striker plate 5 are so aligned that at an arcuate displacement of the flux valve 3 that is greater than that required to cause assembly 8 to contact resilient bumper 6, but less than that required to force resilient bumper 6 to contact the cover plate 1, striker plate 5 will contact rigid bumper 7. An angular range that has been found satisfactory is 30° and 32°, respectively. In addition to the above angular orientation, the rigid bumper 7 and striker plate 5 are oriented such that the force acting on the flux valve at the point of contact will act through the center of percussion, where the center of percussion is defined as the point at which a blow may be struck on a body pivoted or suspended so that the reaction at the support may be zero. Such an orientation will not produce any coupling moments about the suspension assembly 4 and, therefore, the magnitude of the impact force will not have a proportional deleterious effect on the suspension assembly 4.

As stated, the flux valve comprises an upper portion 3 including a rigid frame supporting the magnetic field sensing components and a lower portion 9 comprising the dead weight to insure pendulous movement. A convenient and dynamically accurate positioning of the annular striker plate 5 is between these two portions. This position is designed to correspond substantially to the desired center of percussion and simple addition or subtraction of dead weight can compensate for any inaccuracies.

In the preferred embodiment, the annular striker plate 5 is mounted flush with the bottom of the upper portion and extends beyond its perimeter. The point of attachment is along the inner portion of the striker plate 5. The portion of the dead weight normally adjacent to the striker plate 5 would be removed so as to provide a small amount of free space between the striker plate 5 and the dead weight. The effect of the free space is readily apparent when the flux valve is examined at the point of impact between the striker plate 5 and rigid bumper 7. The combined effect of the inward point of attachment and the free space is that of providing a bending capability to the striker plate 5, and the deflection will mitigate an instantaneous stop. The edge of the striker plate 5 may be angled or beveled so as to present less resistance to a wiping action across the rigid bumper 7. The cross section of rigid bumper 7 may be square, rectangular, or the surface contacting striker plate 5 may be angled to promote a more slidable engagement.

If desired, both the resilient and rigid bumpers may be incorporated into one unit acting on the flux valve at the point of percussion. For example, the rigid bumper 7 may have a soft stop spaced just in front of it. Alternately, it may be bifurcated to provide the front soft stop. Such a modification would avoid the relatively small coupling moments at the pivot point extant during contact with the previously described resilient bumper.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. A flux valve compass assembly adapted to be located within a vehicle for determining the heading of the vehicle with respect to the earth's magnetic field and subject to vibration and shock loads, said assembly including a housing comprised of a lower bowl-shaped member and a top cover plate for universally suspending a pendulous member comprising a flux valve from the cover plate and containing a viscous dielectric fluid whereby the flux valve has a damped freedom about the roll and pitch axes of the vehicle, wherein the improvement comprises resilient bumper means for resisting pendulous movement of the pendulous member beyond a predetermined range of freedom, rigid bumper means for limiting pendulous movement of the pendulous member subsequent to engagement thereof with said resilient bumper means, and said rigid bumper means being so located relative to the point of suspension of the pendulous member that it contacts said pendulous member substantially at the center of percussion thereof whereby substantially no coupling moments are imposed on the universal mounting.

2. The apparatus as described in claim 1 wherein said rigid bumper means comprises an annular member affixed to said bowl-shaped member, and said pendulous member comprises an annular striker plate affixed to said flux valve, whereby pendulous movement of said flux valve is limited by said striker plate contacting said annular member.

3. The apparatus as described in claim 2 wherein said rigid bumper means has a substantially flat annular surface, and the striker plate peripheral edge has a substantially tapered termination whereby engagement of said striker plate with said flat surface produces a wiping stop action.

4. The apparatus as described in claim 3 wherein said pendulous member comprises an upper portion comprising a frame adapted to support magnetic field sensing elements, a lower portion rigidly affixed to said upper portion comprising dead weight for assuring pendulous movement and having an annular depression, and said striker plate disposed between said upper and lower portion and adjacent said upper portion, whereby the wiping action of said striker plate and said bumper means causes said striker plate to deflect toward said depression of said lower portion.

5. The apparatus as described in claim 4 wherein said freedom of movement is limited by said resilient bumper means to substantially 30° from the vertical, and said freedom of movement is further limited by said rigid bumper means to substantially 32° from the vertical.

* * * * *